March 13, 1934. A. R. THOMAS ET AL 1,950,703
REFRIGERATION
Filed Aug. 20, 1930 2 Sheets-Sheet 2
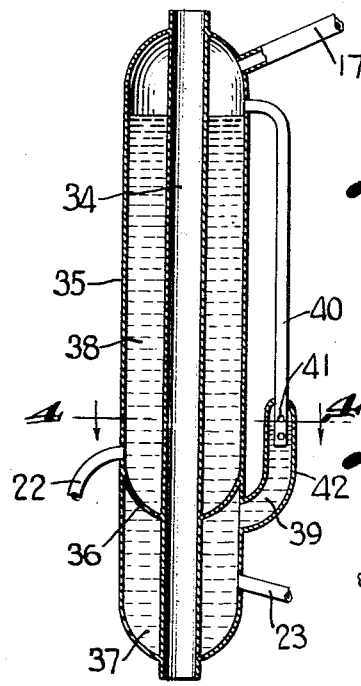
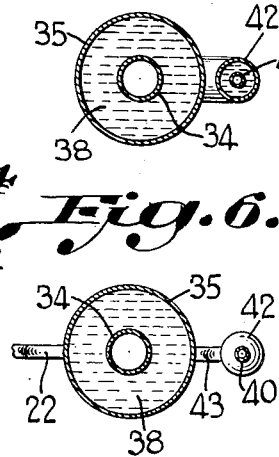
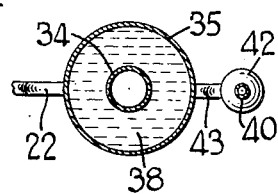
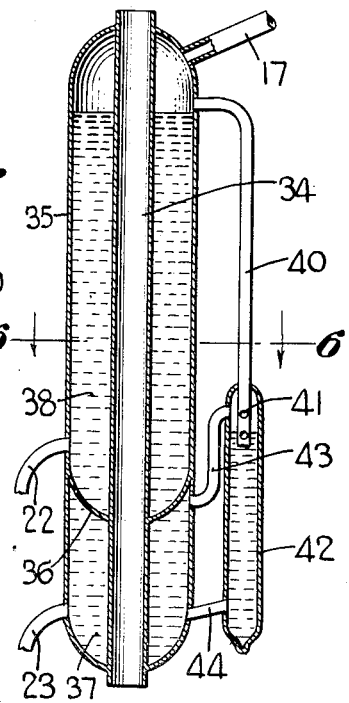
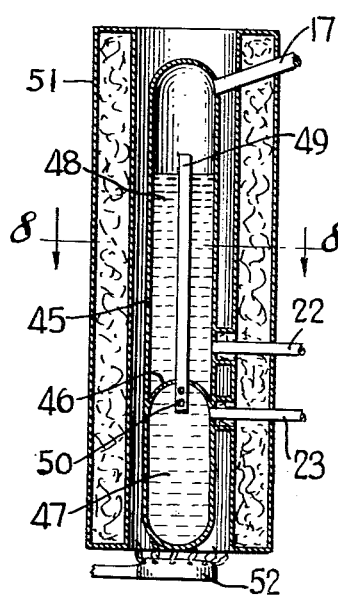
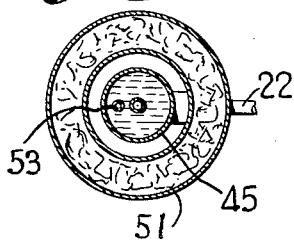
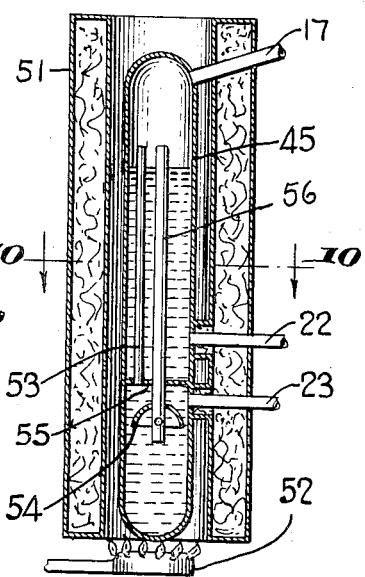
Inventor:
Albert R. Thomas
Robert S. Taylor
By H. Yates Dowell Atty.

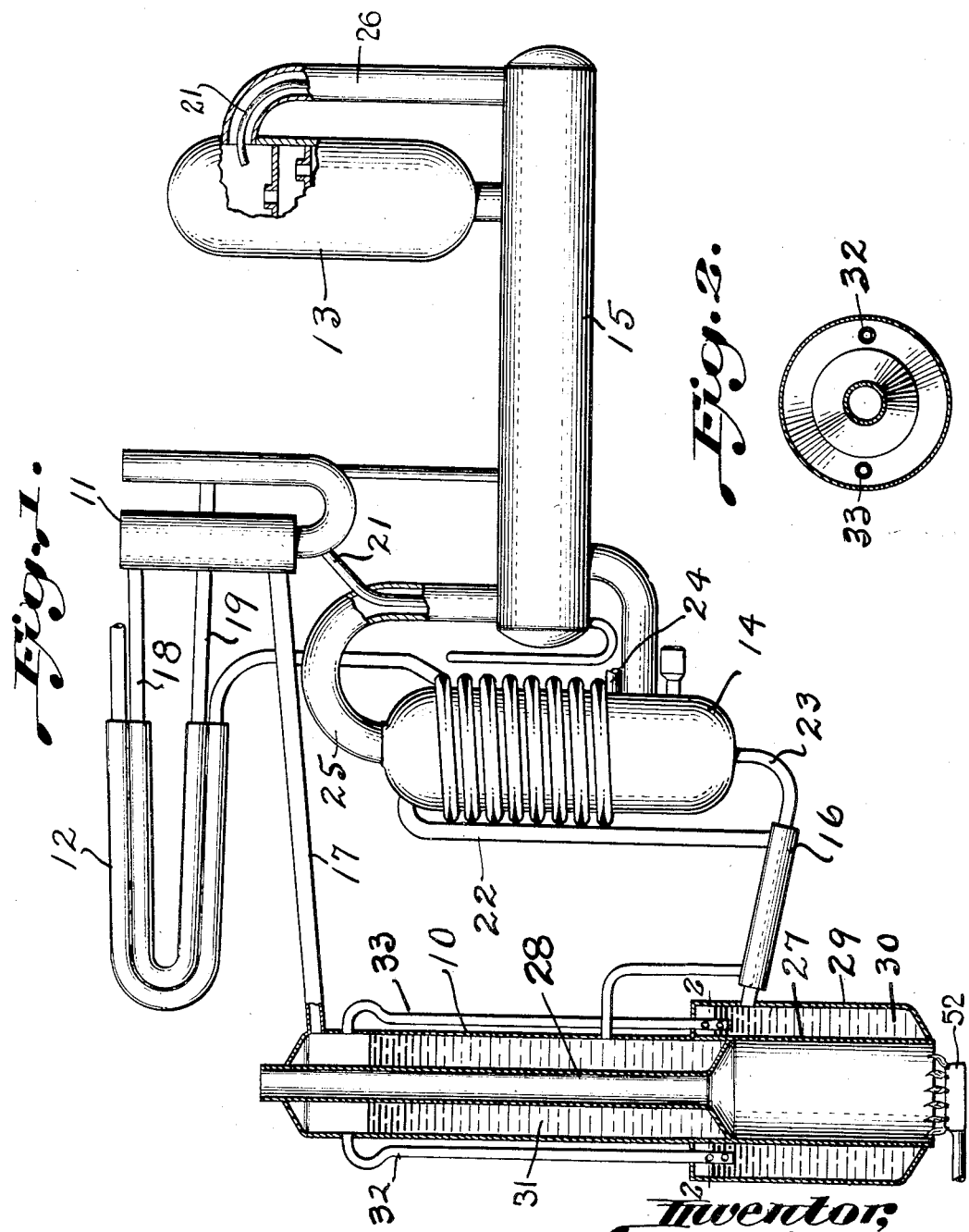

Patented Mar. 13, 1934

1,950,703

UNITED STATES PATENT OFFICE 1,950,703

REFRIGERATION

Albert R. Thomas and Robert S. Taylor, New York, N. Y., assignors to Electrolux Servel Corporation, New York, N. Y., a corporation of Delaware Application August 20, 1930, Serial No. 476,498

23 Claims. (Cl. 62—119.5)

This invention relates to refrigeration and more particularly to continuous absorption refrigeration systems of the pressure equalized type, for instance, as disclosed in Patent No. 1,609,334 to Von Platen, et al., wherein heat is employed for driving off the refrigerant from a solution, such heat being supplied by a gas flame, electrical heating element or the like to a boiler or generator containing the solution to be heated.

It is an object of the invention to provide an improved boiler or generator for absorption refrigeration apparatus, having an increased efficiency and one which will appreciably reduce if not prevent dry boiling or direct heating of certain portions of the boiler when such portions are dry or not covered with liquid.

In the drawings:

Fig. 1 is a diagrammatic view illustrating the application of the invention;

Fig. 2, a section on the line 2—2 of Fig. 1;

Fig. 3, a modified form of boiler;

Fig. 4, a section on the line 4—4 of Fig. 3;

Fig. 5, a further modified form of boiler;

Fig. 6, a section on the line 6—6 of Fig. 5;

Fig. 7, a further modified form of boiler;

Fig. 8, a section on the line 8—8 of Fig. 7;

Fig. 9, a still further modified form of boiler; and

Fig. 10, a section on the line 10—10 of Fig. 9.

In the drawings, reference character 10 indicates a generator or boiler, 11 a rectifier, 12 a condenser, 13 an evaporator or cooling unit, 14 an absorber, 15 a gas heat exchanger and 16 a liquid heat exchanger. Strong liquid or distilled water containing a high concentration of ammonia is heated by the gas flame or other heating element 52 in the lower extremity of the generator. Ammonia vaporizes and passes through pipe 17 into the rectifier where a substantially constant temperature is maintained by the evaporation of refrigerant from the previously liquefied refrigerant in the bottom of the U-tube of the rectifier. The refrigerant vapor then passes from the rectifier through the upper leg 18 of the water cooled condenser where it is cooled and liquefied and flows through the lower inclined leg 19 of the condenser into the remote leg of the rectifier 11. When the level of the refrigerant in the rectifier U-tube becomes higher than the end of the pipe 21 where it discharges into the evaporator, the liquid refrigerant flows from the rectifier through such inlet pipe 21, which latter extends through the heat exchanger 15, into the evaporator or chilling unit, where it evaporates and absorbs heat from the cabinet or compartment in which the chilling unit is located.

The system contains an inert gas which, for example, may be hydrogen for maintaining a constant pressure in the system and avoiding the necessity of valves, checks or the like. As the refrigerant evaporates into the inert gas, the mixture being heavier than the inert gas sinks in the evaporator and passes through the heat exchanger 15 into the absorber 14. In the absorber 14 the mixture of the refrigerant and inert gas is exposed to a stream of liquid weak in refrigerant, which stream enters the absorber through a pipe 22 which extends from the generator and is cooled by contact with a pipe 23 leading from the bottom of the absorber to the lower portion of the boiler or generator for conducting liquid rich in refrigerant to the boiler.

The weak liquid absorbs refrigerant vapor from the inert gas mixture entering the absorber from the gas heat exchanger 15. This dissolving or absorbing of the refrigerant from the mixture generates heat and, therefore, requires that the absorber be cooled. The cooling of the absorber is accomplished by the water supply conduit 24 which is in thermal relation with the absorber, and which is also extended in thermal relation with the condenser, thus causing condensation of the refrigerant vapors in the condenser. The gas in the absorber becomes lighter as the refrigerant vapor is dissolved therefrom and thus rises in the absorber, flowing out through the gas heat exchanger and pipe 26 back to the evaporator which is at a higher level than the absorber. The weak liquid from the boiler absorbs the refrigerant during its downward passage through the absorber and passes by gravity to the lower section 30 of the boiler or generator 10. This solution strong in refrigerant is lifted from the lower portion of the generator to the upper portion of the same by means of a thermosyphon pump actuated by the heat from the burner 52. The heat therefore performs a dual function; namely, vaporizing the refrigerant from the absorption liquid and also circulating absorption liquid. This vaporization of refrigerant and circulation of absorption liquid is continuous in the cycle of operation in the refrigerating unit.

The specific boiler or generator construction shown in Figs. 1 and 2 comprises a cylindrical shell 27 of uniform diameter. This cylinder is provided with a flue 28 of smaller diameter having its lower end flared into contact with and secured to the inner surface of the cylinder sleeve 27. About the exterior of the sleeve 27 below the extremity of the flue 28 is provided an annular jacket 29 which forms a lower pump chamber 30. The chamber 31 within the cylinder wall about the flue 28 is adapted to contain a weak solution of the refrigerant. In the illustration shown, we have provided two pump pipes 32 and 33 which extend from the chamber 30 into the upper extremity of the chamber 31. These pump pipes are preferably provided with vertically spaced openings adjacent their lower extremities, such openings being placed at different levels on the two pump pipes in order to permit one pump pipe to be used with lower energy inputs and the other or both pipes to be used with higher inputs. The level of the holes in the pump pipes is sufficiently high above the bell or flared portion of the inner flue to prevent the liquid level from ever dropping as far as the top of this bell or flare. With this construction, the liquid level in chamber 30 will never drop to such a point that there will be a direct contact of the flame with a portion of metal which is not covered with liquid.

The invention shown in Figs. 1 and 2 consists also in providing a relatively large combustion chamber such that considerable leeway is allowed in burner construction. It has been found that more complete combustion is obtained with the combustion chamber large enough to allow proper access of secondary air to the flame. In large capacity units, requiring a correspondingly large energy input, the burner design and combustion chamber size must be such that a comparatively large flame surface is presented to the secondary air in order to get complete combustion. Bulk and weight of the boiler is reduced by reducing the upper portion of the flue to a smaller diameter than the combustion chamber.

While there are shown two pump pipes, it is clearly within the scope of the invention to use a larger or smaller number of such pipes if desired.

As shown in Figs. 3 and 4, the boiler comprises a central flue 34 of uniform diameter and an external cylinder 35 having its ends closed and providing a chamber around the flue within the jacket 35. In order to divide this chamber into two compartments, a partition plate 36 is employed. The pipe 23 permits the passage of rich liquid from the lower part of the absorber to a pump chamber 37 of the boiler as in Fig. 1 and weak liquid is permitted to pass from the chamber 38 of the boiler through the pipe 22 to the upper portion of the absorber as in Fig. 1. The upper portion of the pump chamber 38 is adapted to be connected by the pipe 17 with a rectifier. In order to accomplish a pumping operation as well as the vaporizing of the refrigerant, a spout or outwardly and upwardly extending pipe 39 is provided to permit the rich liquid in the pump chamber to readily enter the same and projecting down into this member 39 is a pump pipe 40 which extends from the upper portion of the weak liquid chamber 38 down into such member 39, such pump pipe being provided with spaced holes or apertures 41 within the pipe 39 in order to control the level of the liquid within the same. It will be understood that the chamber formed by the spout 39 extends above the top of chamber 37, and that the holes 41 in the lower end of the thermosyphon conduit 40 are at such a level that liquid is not displaced below the top of chamber 37, whereby the flue extending through this chamber is at all times covered by liquid.

The structures of Figs. 5 and 6 are identical with Figs. 3 and 4 with the exception that the member 39 of Figs. 3 and 4 is modified and, as shown in Figs. 5 and 6 comprises, a cylinder 42 supported in parallel relation to the axis of the boiler and connected by small pipes 43 and 44 with the upper and lower portions respectively of the pump chamber.

In Figs. 7 to 10 are shown two further modifications of the present invention wherein a boiler is provided which has an external flue instead of an internal flue as shown in the previous figures.

In Fig. 7 is shown a cylinder 45 closed at its ends and provided with a cupped partition plate 46 which divides the boiler into a lower pump chamber 47 adapted to contain the rich liquid and an upper pump chamber 48 adapted to contain weak liquid. A percolator tube or pump pipe 49 is centrally disposed within the cylinder 45, the lower end of such tube extending through the partition plate 46 into the lower chamber 47 and the upper end of the tube extending upwardly in the upper chamber 48 to a point near the top of the same and through which liquid is adapted to be spurted as through any ordinary percolator tube from the lower into the upper chamber. A pair of spaced apertures 50 are provided in the lower portion of the percolator tube for controlling the height of the liquid in the chamber 47. It will be understood that the location of the apertures 50 with respect to the cupped partition plate 46 is such that the liquid level in the lower chamber 47 is not depressed below the heated walls thereof. The upper portion of the chamber containing the vaporized refrigerant is connected by pipe 17 with the rectifier 11. The lower portion of the same chamber connects by pipe 22 with the absorber, while the lower pump chamber 47 receives liquid from the absorber through pipe 23. Around the cylinder 45 is disposed an insulating jacket 51 which serves to confine the heat from the burner 52 and thus economize the input. The quantity of gas capable of being burned without odor is greater in a construction of this character than with an internal flue on account of the increased size of the combustion chamber. It further permits the use of the ring type or other desired form of burner and complete combustion may be obtained even where large volumes of gas are consumed in large size units.

Referring to Figs. 9 and 10, in a generator similar to that described in connection with Fig. 7, an ordinary partition plate 55 forms an upper compartment for weak liquor and a lower compartment for rich liquor, a vent pipe 53 permitting any gas entrapped in the lower compartment to pass into the upper compartment. A percolator tube 56 is provided which has an inverted cup 54 around its lower end and is adapted to operate in the usual manner as a thermosyphon pump as previously described. It is, of course, possible to use two or more pump pipes in any of the above arrangements including both the external or internal flue boilers. The inverted cup 54 performs the same function as the cupped partition 46 in the modification shown in Fig. 7, that is, segregates the vapor space in the pumping chamber from the heated walls.

It will be obvious to those skilled in the art that various changes may be made in this invention without departing from the spirit thereof, and the invention is not limited to what is shown in the drawings and described in the specification, but only as indicated in the appended claims.

We claim:

1. A generator consisting of an upright cylinder, an inner flue flared outwardly at the lower end and welded into said cylinder so as to form a chamber for weak liquid around the flue, and a casing forming an annular chamber for rich liquid around the lower part of said cylinder, the top of said annular chamber being above the flared lower end of said flue.

2. A generator consisting of an upright cylinder, an inner flue flared outwardly at the lower end and welded into said cylinder so as to form a chamber for weak liquid around the flue, an annular chamber for rich liquid around the lower end of said cylinder, the top of said annular chamber being above the flared lower end of the flue, a pump pipe entering said outer annular chamber and forming a connection between the annular chamber and the upper weak liquid chamber, said pump pipe having holes placed at a higher level than the flared portion of the inner flue, and adapted to maintain the level of the liquid in the lower annular chamber higher than the flared portion of the inner flue.

3. A boiler comprising an enlarged combustion chamber and a smaller diameter flue, the smaller diameter flue being surrounded by an annular chamber, the liquid contents of which receive heat from the flue and the outer diameter of which is essentially the same as that of the combustion chamber, the combustion chamber being surrounded by a rich liquid chamber in which the liquid-vapor interface is maintained in contact with the outer jacket of the upper or weak liquid chamber.

4. A generator comprising an internal flue, a jacket around said flue divided into two parts by means of an upwardly cupped partition, a spout connected to the top of said lower chamber and extending upwardly, a pump pipe welded into the top of said spout and forming a connection between said spout and the upper chamber, apertures in said pump pipe located at such levels as to always maintain the liquid surface within the spout an appreciable distance above said partition.

5. A generator comprising a cylinder, a flue having its lower end flared outwardly into engagement with the cylinder to form a lower enlarged combustion chamber with a reduced flue extending upwardly therefrom and a compartment for weak liquid around the flue, a jacket around the lower portion of the cylinder forming a compartment for rich liquid and a plurality of pump pipes projecting into the rich liquid compartment and having communication with the weak liquid compartment, the portions of the pump pipes projecting into the rich liquid compartment being provided with spaced ports for determining the liquid level within the rich liquid compartment, the ports on one pump pipe being disposed in different elevation from the ports on another pump pipe, whereby the pump pipes will be progressively brought into use.

6. A generator comprising a vessel having a partition dividing the same into upper and lower compartments, a pump pipe forming communication between said compartments, a jacket surrounding the vessel and laterally spaced from the same and forming an external flue about the vessel.

7. A generator comprising a vessel having a partition dividing the same into upper and lower compartments, a pump pipe forming communication between said compartments whereby liquid heated in the lower compartment will be conveyed into the upper compartment, a jacket surrounding and laterally spaced from said vessel and forming an external flue about the vessel, said pump pipe being disposed concentrically of said vessel.

8. A generator comprising a vessel having a partition plate dividing the same into an upper and lower compartment, a pump pipe forming communication between said compartments whereby liquid heated in the lower compartment will be spurted into the upper compartment, a jacket surrounding the vessel and laterally spaced from the same and forming an external flue about the vessel, said pump pipe being disposed concentrically of said vessel, and a vent pipe forming communication between said upper and lower compartments.

9. A generator comprising an upright vessel, an inverted cup-shaped partition dividing said vessel into upper and lower compartments, and a pump pipe disposed centrally of said vessel for transferring liquid from the lower to the upper compartment.

10. A generator comprising an upright vessel, an inverted cup-shaped partition plate dividing said vessel into upper and lower compartments, a pump pipe disposed centrally of said vessel for transferring liquid from the lower to the upper compartment, said pump pipe having an aperture in the reduced upper portion of the lower compartment.

11. A generator comprising an upright vessel, an inverted cup-shaped partition dividing said vessel into upper and lower compartments, a pump pipe disposed centrally of said vessel for transferring liquid from the lower to the upper compartment, said pump pipe having spaced apertures in the reduced upper portion of the lower compartment, and a casing around the vessel forming an external flue for the same.

12. A generator comprising chambers for strong and weak liquid, means for heating said chambers, one of said chambers having a vapor space insulated by liquid contained in the other of said chambers from the direct action of heat.

13. A generator comprising a combustion chamber, a flue extending from said combustion chamber, a jacket around said flue forming a liquid chamber, and a casing forming a closed chamber around the combustion chamber and a portion of said jacket.

14. A generator for absorption refrigerating apparatus including a plurality of chambers for absorption liquid and a flue extending in heat exchange relation with said chambers, one of said chambers having a vapor space separated from said flue by liquid contained in another of said chambers.

15. A generator for absorption refrigerating apparatus including a chamber for absorption liquid having a vapor accumulating space and a surface through which heat is transmitted to said chamber and extending above said vapor space, said chamber being constructed such that absorption liquid separates the vapor space from said heat transfer surface.

16. A generator for absorption refrigerating apparatus including upper and lower chambers for absorption liquid having vapor accumulating spaces and a substantially vertical surface through which heat is transferred to said chambers, said lower chamber being constructed such that its vapor space is separated by absorption liquid from said heat transfer surface, and a thermosyphon conduit connected to utilize vapor generated in the lower chamber to raise absorption liquid into the upper chamber.

17. A generator for absorption refrigerating apparatus including superimposed chambers for absorption liquid having a substantially vertical surface for transfer of heat to said chambers, a third chamber arranged to receive liquid and vapor from the lower of said superimposed chambers and located so as to be separated from said heat transfer surface by absorption liquid, and a thermosyphon conduit for absorption liquid from said third chamber to the upper of said superimposed chambers.

18. A generator for absorption refrigerating apparatus including superimposed chambers for absorption liquid having a substantially vertical surface for the transfer of heat to said chambers, and means for receiving liquid and vapor from the lower of said chambers and raising the liquid into said upper chamber by thermosyphonic action, said means being separated by absorption liquid from said heat transfer surface.

19. A generator for absorption refrigerating apparatus comprising two contiguous chambers for absorption liquid, means for applying heat along the length of both of said chambers, said chambers being constructed such that liquid contained in one of the chambers is maintained between said heating means and the upper portion of the other chamber.

20. A generator for absorption refrigerating apparatus comprising superimposed chambers and heating means extending upwardly the height of said chambers, said chambers being constructed such that liquid contained in the lower part of the upper chamber is maintained between said heating means and the upper part of the lower chamber.

21. A generator for absorption refrigerating apparatus comprising superimposed chambers and a flue extending upwardly the height of said chambers, said chambers being constructed such that liquid contained in the lower part of the upper chamber is maintained between said flue and the upper part of the lower chamber.

22. A generator for an absorption refrigeration apparatus comprising, an upright cylindrical casing, a flue extending upwardly within said casing having its lower end flared outwardly into engagement with said casing forming therewith a lower combustion chamber with the flue extending upwardly therefrom and a chamber for weak solution around the flue, a jacket around the lower portion of said casing forming a chamber for strong solution around said combustion chamber and extending above the bottom of said weak solution chamber, and a thermosiphon conduit from the upper portion of said strong solution chamber to the upper part of said weak solution chamber.

23. A generator for an absorption refrigeration apparatus comprising, an upright cylindrical casing, a flue extending upwardly within said casing having its lower end flared outwardly into engagement with said casing forming therewith a lower combustion chamber with the flue extending upwardly therefrom and a chamber for weak solution around the flue, a jacket around the lower portion of said casing forming a chamber for strong solution around said combustion chamber and extending above the bottom of said weak solution chamber, and a thermosiphon conduit extending from within said strong solution chamber to the upper part of said weak solution chamber, the portion of said conduit within said strong solution chamber being provided with an opening located at such a level as to maintain the level of strong absorption solution above said combustion chamber.

ALBERT R. THOMAS.
ROBERT S. TAYLOR.